United States Patent
Jin et al.

(10) Patent No.: US 6,765,808 B1
(45) Date of Patent: Jul. 20, 2004

(54) POWER CONVERTER WITH CROSS CURRENT SENSING

(75) Inventors: Xiao Ping Jin, Santa Ana, CA (US); Jian Ping Fan, Orange, CA (US)

(73) Assignee: Broadband Telcom Power, Inc., Santa Ana, CA (US)

( * ) Notice: Subject to any disclaimer, the term of this patent is extended or adjusted under 35 U.S.C. 154(b) by 28 days.

(21) Appl. No.: 10/323,359

(22) Filed: Dec. 17, 2002

(51) Int. Cl.⁷ .............................................. H02M 3/335
(52) U.S. Cl. ...................................... 363/16; 363/131
(58) Field of Search ............................ 363/16, 131, 15

(56) References Cited

U.S. PATENT DOCUMENTS

| | | | |
|---|---|---|---|
| 4,717,994 A | 1/1988 | Diaz et al. | |
| 4,794,507 A | 12/1988 | Cavigelli | |
| 5,036,450 A | 7/1991 | Kelleher, Jr. et al. | |
| 6,198,637 B1 * | 3/2001 | Hosotani et al. | 363/19 |
| 6,285,567 B1 * | 9/2001 | Kennedy | 363/21.01 |
| 6,366,484 B1 | 4/2002 | Jin | |

* cited by examiner

Primary Examiner—Shawn Riley
(74) Attorney, Agent, or Firm—Kam T. Tam

(57) ABSTRACT

A power converter includes a transformer disposed between an input circuit and an output circuit. The transformer has primary and secondary windings coupled to the input and output circuit, respectively. Current passing through the input circuit is sensed and fed to a RC (Resistance-Capacitance) circuit which generates a signal proportional in magnitude to the output current sourcing out of the output circuit.

26 Claims, 9 Drawing Sheets

POWER CONVERTER WITH CROSS CURRENT SENSING

BACKGROUND OF THE INVENTION

1. Field of the Invention

The present invention relates generally to electrical power converters, and more particularly, to sensing and monitoring of electrical power in DC-to-DC switching-mode power converters.

2. Description of the Related Art

To convert one DC (Direct Current) level to another, a DC-to-DC switching-mode converter is commonly employed to perform the task. FIG. 1 shows a conventional DC-to-DC switching-mode converter signified by the reference numeral 2. The converter 2 has an input circuit 4 and an output circuit 6 separated by a transformer 8. The input circuit 4 includes a switch 10 controlled by a control circuit 12. One terminal of the switch 10 is tied to the primary winding 12 of the transformer 8. The other terminal of the switch 10 is connected to a DC input $V_{IN}$. The output circuit 6 includes an inductor 15 and a capacitor 16 connected in series. The common connection of the inductor 15 and the capacitor 16 drives a load 18. The primary and secondary windings 12 and 20 of the transformer 8 have N1 and N2 winding turns, respectively. Disposed between the secondary winding 20 of the transformer 8 and the inductor 15 is a diode 14. Further, connected across the inductor 15 and the capacitor 16 combination is another diode 17.

During operation, an input DC voltage $V_{IN}$ is supplied to one terminal of the switch 10. The control circuit 12 generates a periodic output which in essence periodically turns on and off the switch 10. As a consequence, a time-varying current $i_P$ with periodic current pulses flows through the primary winding 12 of the transformer 8. In this specification, the lowercase alphabets are used to denote parameters that vary with time. Because the primary and secondary windings 12 and 20 are inductively coupled together, a secondary current $i_S$ is thereby induced in the secondary winding 20. The secondary current $i_S$ passes through the diode 14 which admits only positive current cycles but blocks away any negative counterparts. Since both the inductor 15 and the capacitor 16 respectively assume high inductive and capacitive values, they cooperatively contribute to a slow time-constant.

When the secondary current $i_S$ with a positive current cycle impinges upon the secondary circuit 6, the diode 14 is forward biased. The secondary current $i_S$, after passing through the forward biased diode 14, charges sluggishly through the inductor 15 and capacitor 16. At this juncture, the power converter 2 is said to be in the forward rectification mode.

When the diode 14 is not forward biased, to maintain continuous current flow, magnetic energy stored in the inductor 15 discharges into the capacitor 16 and flows through the diode 17. The power converter 2 is then said to be in the freewheeling mode.

The alternating operating of the forward rectification mode and the freewheeling mode basically allows a DC voltage level to be maintained across the capacitor 16. The DC voltage level is utilized as the DC output voltage $V_{OUT}$ driving the load 18. Depending on the impedance of the load 18, a DC current $I_{OUT}$ is established passing through the load 18, in accordance with Ohm's law.

In practice, the load current $I_{OUT}$ needs to be monitored. Insufficient current flowing through the load 18 may render the load 18 inoperative or malfunctional. On the other hand, excessive current $I_{OUT}$ feeding the load 18 may damage the load 18 and also the power converter 2. Different applications require different current monitoring schemes. For example, in some applications in which the load 18 may require over current protection and thus the upper limit of the output current $I_{OUT}$ must be detected and maintained. As another example, in a shared-load arrangement, the common current $I_{OUT}$ driving the shared load 18 needs also be ascertained for proper load current allocation. Furthermore, in usages where the instantaneous power needs to be known, the instantaneous value of the output current $I_{OUT}$ must also be instantaneously detected and reported.

Heretofore, monitoring of the output current $I_{OUT}$ has mostly been conducted on the secondary side of the transformer 8 by directly measuring the current path through the load 18. A common approach is to place a shunt resistor in series with the load 18. Another known approach is to couple a Hall effect device to the load 18.

First, the use of a Hall effect device involves complicated circuit design and thus costly. In addition, a Hall effect device is spacious. The use of Hall effect devices in most instances is not practical.

The use of shunt resistors for current detection is a common practice but it involves considerable drawbacks. To understand the problems associated with using a shunt resistor, the basic principles of a DC-to-DC converter needs first be explained. Reference is now directed back to FIG. 1. In the DC-to-DC converter 2, if the transformer 8 is a step-down transformer, as is known in the art, the primary and secondary voltages $v_P$ and $v_S$, across the primary and secondary windings 12 and 20, respectively, assume a directly proportional relationship in accordance with the following algebraic expression:

$$\frac{v_P}{v_S} = \frac{N1}{N2} \tag{1}$$

However, the primary and secondary currents $i_P$ and $i_S$ relate to each other by an inversely proportional relationship as expressed by the following mathematical relationship:

$$\frac{i_P}{i_S} = \frac{N2}{N1} \tag{2}$$

In a step-down transformer, the secondary voltage $v_S$ is lower than the primary voltage $v_P$. However, the secondary current $i_S$ is higher than the corresponding primary current $i_P$. In most applications with a DC-to-DC converter, such as the converter 2, the output voltage $V_{OUT}$ is much lower than the input voltage $V_{IN}$, resulting in the output current $I_{OUT}$ much higher than the corresponding input current $I_{IN}$. In practice, sensing a high current always posses technical complications and sometimes fraught with danger. Chief among all is the difficulty in the power management of the shunt resistor. Even though the shunt resistor is normally designed to have a small ohmic value, in terms of degree of difficulty in managing the power of the shunt resistor, the high output current $I_{OUT}$ passing through the shunt resistor more than compensates for the choice of a low resistive value for the shunt resistor in the first place. As is well known, power consumption of a resistor when current passes through the resistor has the following relationship:

$$P = I_{OUT}{}^2 R \tag{3}$$

where P is the power consumed by the shunt resistor in Watts; R is the ohmic value of the shunt resistor; and $I_{OUT}$ is as defined above.

Very often, to meet the low resistive value R and high power dissipation requirements, the shunt resistor with a large physical size has to be selected. Modern day designs of power converters require compactness where the use of large components is not practical. Further, as shown in equation (3), the relationship between the power consumption P and the current $I_{OUT}$ is not linear. Rather, the power consumption P is proportional the square of the current $I_{OUT}$ passing through the resistor. A small increase in current always results in a significant increase in power dissipation.

Furthermore, as is also known in the art, heat also effects the resistive value of a resistor. Excessive self-generated heat from the shunt resistor may cause the shunt resistor drifting in resistive value and thus may yield inaccurate current reading of the output current $I_{OUT}$. Sophisticated thermal management or temperature compensation circuitry may be implemented to rectify such shortfalls but it surely will result in high manufacturing cost and design complication.

U.S. Pat. No. 6,366,484, entitled "Cross-Current Sensing in Power Conversion," issued to Jin on Apr. 2, 2002, addresses the aforementioned problem and discloses an arrangement which senses current in the primary circuit for the current monitoring of the secondary circuit. U.S. Pat. No. 6,366,484, commonly assigned to the present assignee and incorporated herein by reference in its entirely, teaches the use of current-to-voltage converter to convert the sensed primary current into a corresponding voltage, which in turn is maintained by a sample-and-hold circuit for measurement. The present invention involves direct measurement of the sensed primary current via a RC (resistance-capacitance) circuit. The present invention is capable of not only reporting the average reading of the secondary current but also the instantaneous value of the secondary current.

Electronic circuits are now built with ever-increasing miniaturization and complexity. These circuits must be driven by power converters with high reliability achieved in part by sensing current accurately for the delivery of correct power levels. Without resorting to costly and complex designs but with ease in implementation, there is a need to provide precise schemes in sensing output current of DC-to-DC power converters.

SUMMARY OF THE INVENTION

It is accordingly the object of the invention to provide a DC-to-DC power converter with a current sensing mechanism having relative ease and simplicity in implementation. It is also another object of the invention to provide such a converter at low cost and high operational reliability.

The DC-to-DC power converter in accordance with the invention includes a transformer disposed between an input circuit and an output circuit. The transformer has primary and secondary windings coupled to the respective input and output circuits. Current passing through the input circuit is sensed and detected by a detecting circuit which provides the sensed current to a RC circuit which in turn generates a signal proportional in magnitude to the output current sourcing out of the output circuit. If the converter is a step-down converter, the output current is higher than the input current. As arranged, sensing and monitoring the input current instead of the higher output current allows simpler circuit design, lower cost and higher operational reliability.

These and other features and advantages of the invention will be apparent to those skilled in the art from the following detailed description, taken together with the accompanying drawings, in which like reference numerals refer to like parts.

DETAILED DESCRIPTION OF THE INVENTION

Figure 1:
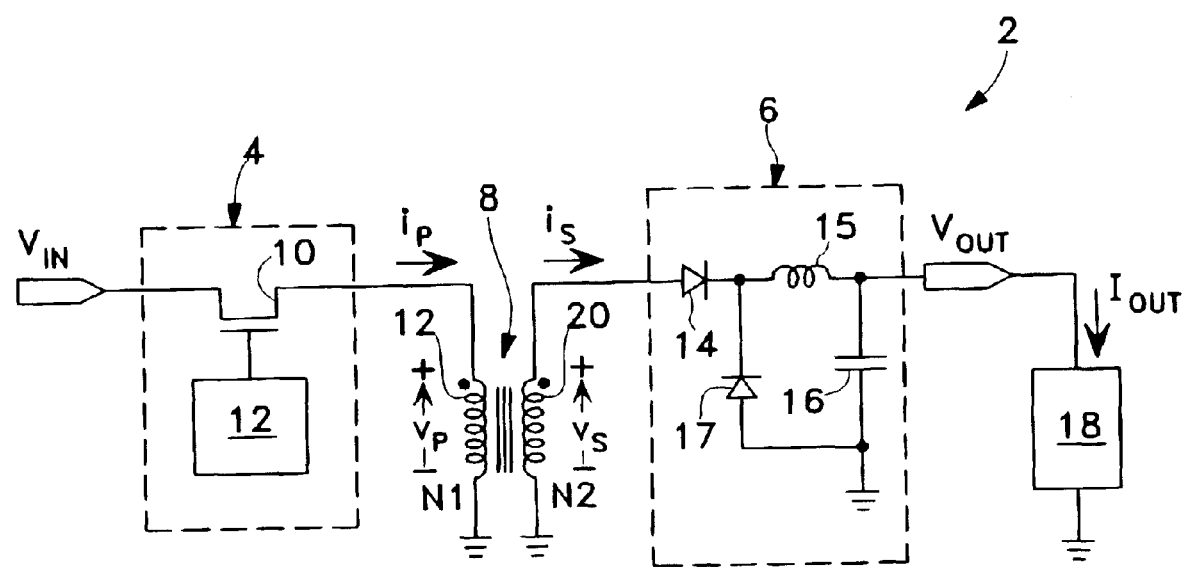
FIG. 1 is a schematic drawing of a known DC-to-DC power converter.
Figure 2:
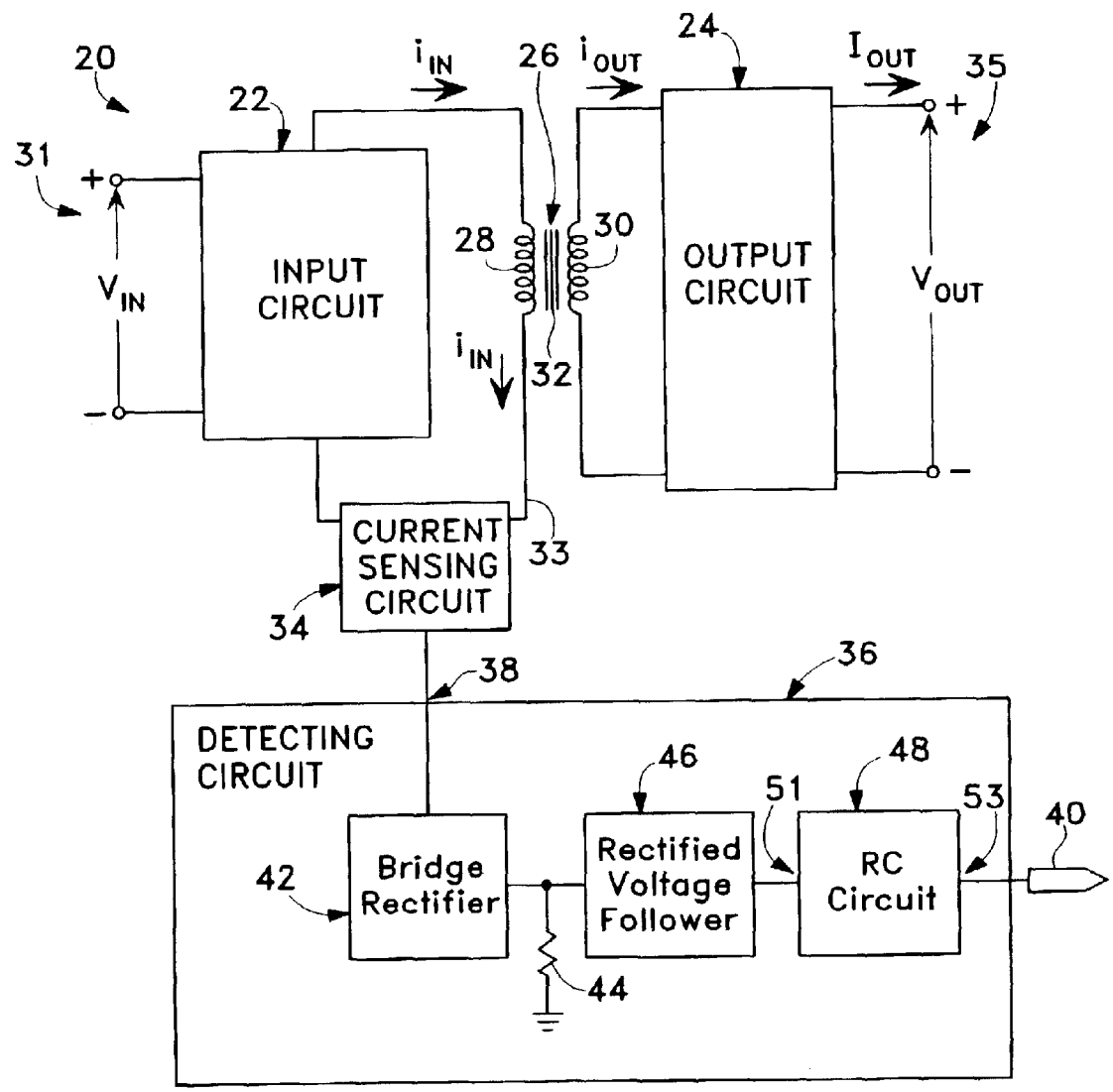
FIG. 2 is a schematic drawing showing the general architecture of the invention.

Reference is now directed to FIG. 2 which shows the overall architectural design of the invention signified by the reference numeral 20. In the following paragraphs, the invention is generally depicted, followed with a more detailed description of the embodiments.

The invention includes an input circuit 22 and an output circuit 24. Disposed between the input and output circuits 22 and 24 is a transformer 26, which has a primary winding 28 and a secondary winding 30 wound around a core 32. The input circuit 22 is connected to the primary winding 28, while the output circuit 24 is tied to the secondary winding 30. In operation, the circuits 22, 24 and the transformer 26 cooperatively function together and convert a DC input voltage supply $V_{IN}$ to a DC output voltage $V_{OUT}$.

The DC input voltage supply $V_{IN}$ is applied to the input 31 of the input circuit 22. The input circuit 22 is a power switching circuit which basically chops the DC voltage $V_{IN}$ into a time-varying voltage with periodic pulses. The transformer 26 thereafter transforms the time-varying voltage to the output circuit 24 which in turn rectifies the transformed voltage as the DC output voltage $V_{OUT}$ available at the output 35 of the output circuit 24.

The input circuit 22 provides a time-varying input current $i_{IN}$ which flows through the primary winding 28 of the transformer 26 via a current path 33 that directly exits out of the primary winding 28. A current sensing circuit 34 is coupled to the current path 33. The current sensing circuit 34 senses the time-varying input current $i_{IN}$ and generates a signal which feeds into a detecting circuit denoted by the reference numeral 36.

The detecting circuit 36 has an input 38 and an output 40. The detecting circuit 36 includes a rectified voltage follower circuit 46 positioned between a bridge rectifier 42 and a RC circuit 48. The bridge rectifier 42 is tied to the input 38 of the detecting circuit 36. The output 53 of the RC circuit 48 is also the output 40 of the detecting circuit 36. There is also a resistor 44 disposed between the bridge rectifier 42 and the rectified voltage follower 46.

Figure 3:
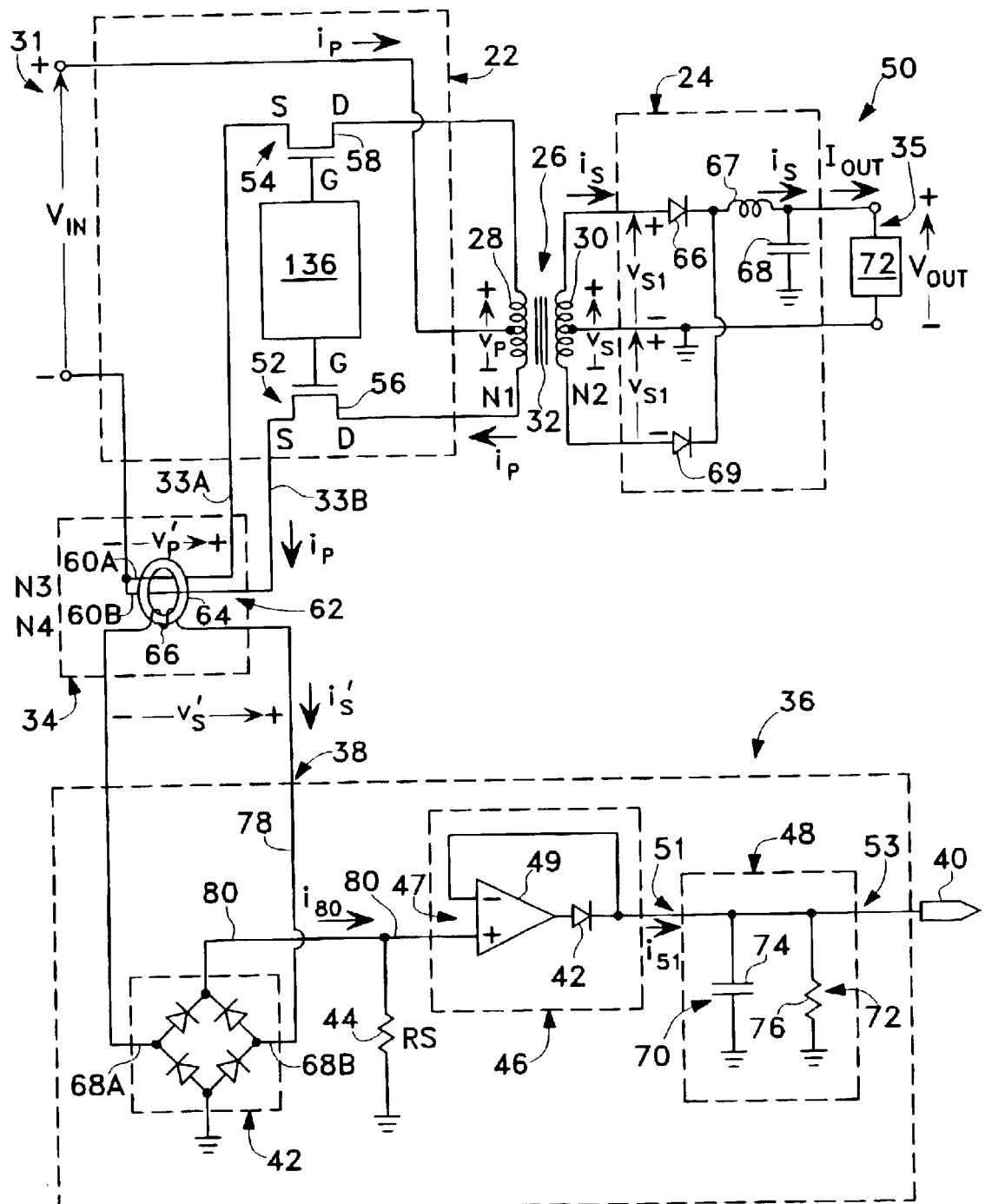
FIG. 3 is a schematic drawing showing the implementation of a first embodiment of the invention.

FIG. 3 shows a first embodiment of the invention signified by the reference numeral 50. In this embodiment, the input circuit 22 is implemented as a push-pull circuit, which includes a pair of switches 52 and 54. In this case, the switches 52 and 54 are FETs (Field Effect Transistors) 56 and 58, respectively. Each of the FETs 56 and 58 has a drain D, a source S, and a gate G. The drain D of the FET 56 is tied to one end of the primary winding 28. The other end of the primary winding 28 connects to the drain D of the other FET 58. The two gates G of the FETs 56 and 58 are controlled by a control circuit 136. The two sources S of the FETs 56 and 58 are connected to the two primary windings 60A and 60B, respectively, of the sensing transformer 62 which will be further described below.

In this embodiment, the primary winding 28 of the transformer 26 is center-tapped and is routed to the positive terminal of the input 31 in the input circuit 22.

The output circuit 24 essentially is a rectifying circuit which includes one diode 66 with the anode connected to one of the secondary winding 30. The cathode of the diode 66 is coupled to a filter inductor 67 which in turn feeds a filter capacitor 68. Likewise, there is another diode 69 with the anode tied to the other end of the secondary circuit 30 and the cathode also coupled to the inductor 67.

The current sensing circuit 34 in this embodiment is a current transformer 62 with a toroidal core 64. Wound around the toroidal core 64 is a secondary winding 66 which are connected across the AC terminals 68A and 68B of the bridge amplifier 42. As mentioned earlier, there are two primary windings 60A and 60B wound around the core 64. It should be noted that the winding directions of the winding 60A and 60B are opposite to each other, as shown in FIG. 3. Thus, when the primary current $i_P$ flows from the source S of the FET 56 into the primary winding 60B, it generates a magnetic flux in the core 64. However, when the primary current $i_P$ flows from the source S of the FET 58 into the other primary windings 60A, it generates another magnetic flux in the core 64 with an equal flux magnitude but an opposite flux direction. Thus, there is no DC flux bias existing in the core 64.

The detecting circuit 36 has an input 38 and an output 40. Connected to the input 38 is the bridge rectifier 42. The output of the bridge rectifier 42 goes to the rectified voltage follower circuit 46, which includes an operational amplifier 49 and a diode 42. The resistor 44 is disposed between the bridge rectifier 42 and the rectified voltage follower 46. More particularly, the resistor 44 has one end tied to the assertive input of the operational amplifier 49 and the DC output 80 of the bridge rectifier 42. The other end of the resistor 44 goes to the ground terminal. The output of the operational amplifier 49 is tied to the anode of the diode 42. The cathode of the diode 42 feeds back to the complementary input of the amplifier 49.

The cathode of the diode 42 also drives the input 51 of the RC circuit 48. The output 53 of the RC circuit 48 is also the output 40 of the detecting circuit 36.

In this embodiment, the RC circuit 48 has a charge-storage circuit 70 connected to a dissipative circuit 72. In particular, in this case, the charge-storage circuit 70 is a capacitor 74. The dissipative circuit 72 is a resistor 76.

In this specification and the appended claims, a RC circuit is construed to include any circuit that has a charge-storage circuit connected to a dissipative circuit, which RC circuit is characterized by and comprises a RC time constant. For ease and clarity in explanation, the RC circuit 48 of FIG. 3 is detached from the rest of the detecting circuit 36 and is duplicated and redisplayed in FIG. 4 for further exposition.

Figure 4:
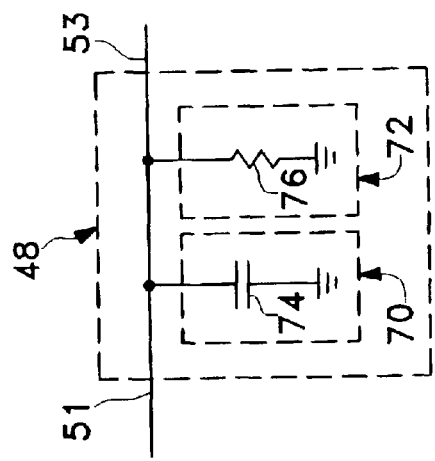
FIG. 4 is a schematic drawing of a RC circuit typically used in the first embodiment.
Figure 5:
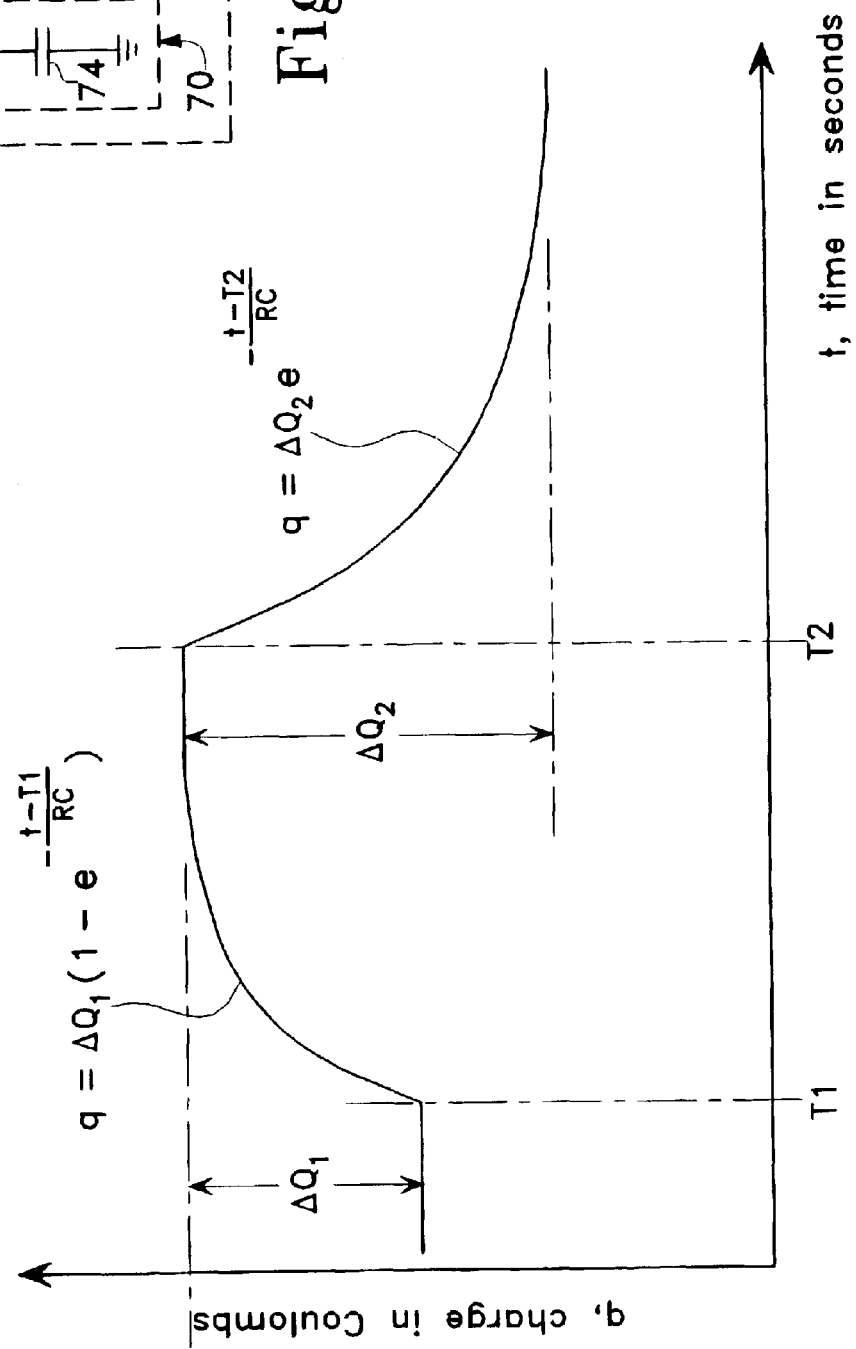
FIG. 5 is a timing diagram illustrating the waveforms of the RC circuit of FIG. 4 during charging and discharging.

Referring to FIG. 4, suppose the capacitor 74 is initially charged. The input 51 of the RC circuit 48 is then sitting at an initial potential. When an external potential higher than the initial potential at the input 51 of the RC circuit 48 is applied to the input 51, electrical charges build up in the charge-storage circuit 70 and the dissipative circuit 76. The rate of charging is exponential. Mathematically, the charging characteristic in which the charge q in Coulombs (C) in the RC circuit 48 as function of the time t in seconds (s) is represented by the following equation:

$$q = \Delta Q_1 \left(1 - e^{-\frac{t-T_1}{RC}}\right) \quad (4)$$

where $\Delta Q_1$ is the difference in charge in Coulombs before and after the charging process; R is resistive value of the dissipative circuit 76 in Ohms (Ω); c is the capacitive value of the charge-storage circuit in Farads (F); $T_1$ is the starting time of the charging process; and e is the base of natural logarithm. FIG. 5 shows the graphical representation of equation (4).

In a similar fashion, when a potential lower than the corresponding initial potential at the input 51 of the RC circuit 48 is applied to the RC circuit 48, electrical charges dissipate in the charge-storage circuit 70 through the dissipative circuit 72 exponentially. Mathematically, the discharging characteristic in which the charge q in Coulomb in the RC circuit as function of the time t in seconds is represented by the following equation:

$$q = \Delta Q_2 e^{-\frac{t-T_2}{RC}} \quad (5)$$

where $\Delta Q_2$ difference in charge in Coulombs before and after the discharging process; R and C are defined as above; $T_2$ is the starting time of the discharging process; and e is the base of natural logarithm. FIG. 5 illustrates the graphical representation of equations (5). The product of the resistive value, R, of the dissipative circuit 72 and the capacitive value, C, of the charge-storage circuit 70 is called the RC time constant of the RC circuit 48. The differences in charges $\Delta Q_1$ and $\Delta Q_2$ are arbitrarily chosen.

Having the RC circuit 48 generally explained, reference is now directed back to FIG. 3. The operation of the first embodiment 50 is described below by referring to FIG. 3 in conjunction with the timing diagram of FIG. 6. For ease of explanation, numerical values are used. It should be noted that the numerical values used are by no means construed as limiting and are presented herein only for reference purposes.

Suppose an input DC voltage $V_{IN}$ of 100 V peak-to-peak is to be converted to an output voltage $V_{OUT}$ of 5 V. The output current $I_{OUT}$ driving the load 72 needs to be constantly sensed during normal operation.

Figure 6:
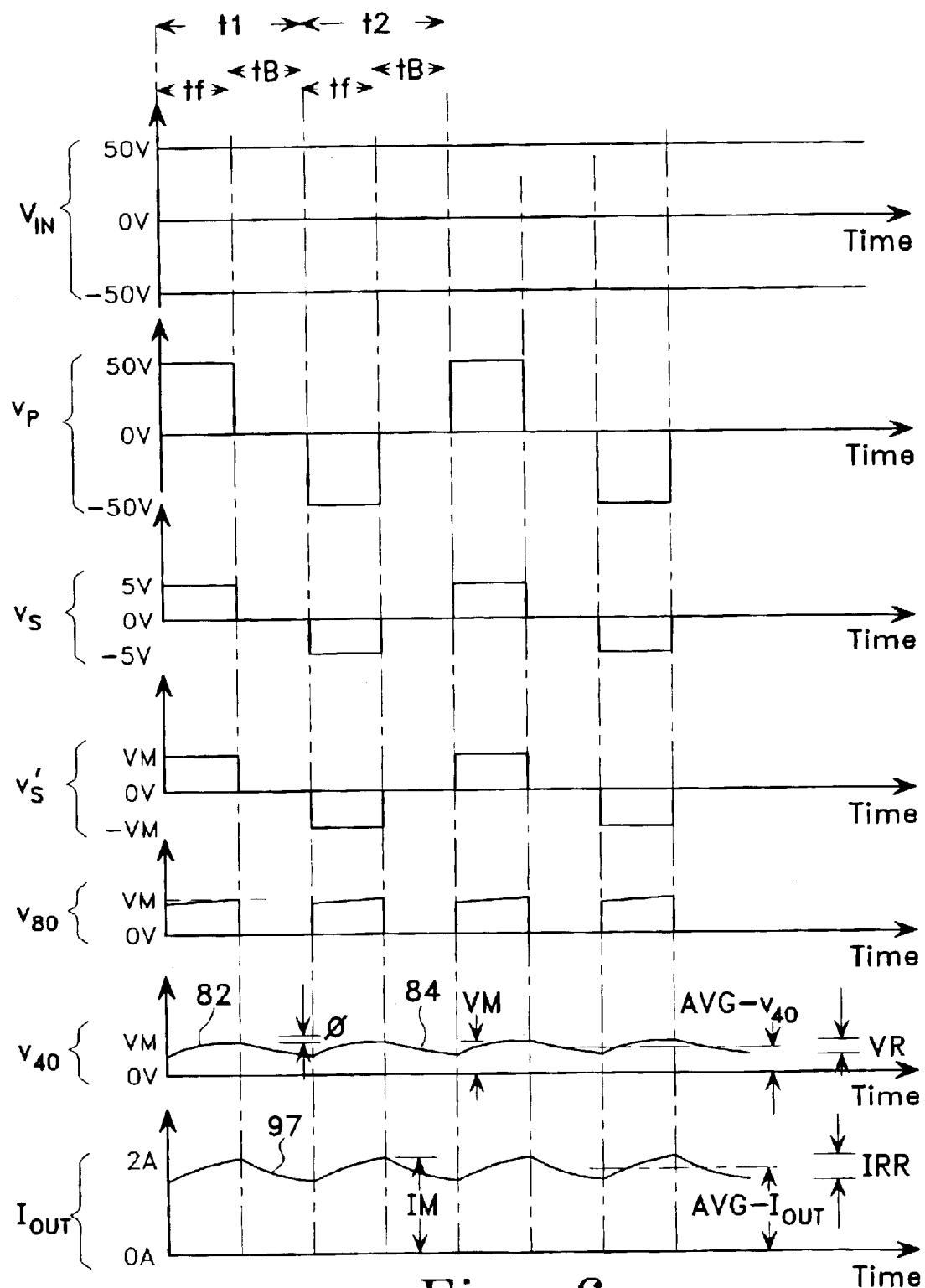
FIG. 6 is a timing diagram showing the waveforms of the invention during normal operation.

First, a DC input voltage $V_{IN}$ is applied to the input 31 of the input circuit 22. In this instance, the input ranges from the negative polarity of −50 V to the positive polarity of +50V. The two FETs 56 and 58 are turned on and off alternately by the control circuit 136. The alternating turning on and off of the FETs 56 and 58 in essence segments the DC input voltage $V_{IN}$ into a time-varying signal as waveform $v_P$ across the primary winding 28. There are also blanking periods tB inserted between the turning on and off the FETs 56 and 58, as shown in FIG. 6. During the time interval tB, both the FETs 56 and 58 are shut off. The blanking period tB is built in for the purpose of preventing the two FETs 56 and 58 from simultaneously turned on thereby causing cross-conduction. Furthermore, the duration of the blanking period tB determines the magnitude of the output voltage $V_{OUT}$. As will be described below, within the blanking period tB, it is also the time the output circuit 24 enters into the freewheeling mode. The durational length of the freewheeling mode within a switching cycle can be used to regulate the output voltage magnitude at the output 35.

The wave shape of the time-varying signal $v_P$ is as shown in FIG. 6. Specifically, during the time duration tf within the time period t1, when the FET 56 is turned on, the FET 58 is turned off. The primary current $i_P$ flows from the positive terminal of the input 31 through the primary winding 28 and the FET 56. Thereafter, the current $i_P$ passes through the toroidal core 64 of the sensing transformer 62. As a consequence, a signal is induced in the secondary winding 66 of the transformer 62 as a positive voltage pulse, shown in FIG. 6 as the waveform $V'_S$ at the node 78 during the time period t1. At the same time, a secondary voltage $v_S$ is induces at the secondary winding 30 of the transformer 26. The induced voltage $V_S$ charges through the diode 66 and the inductor 67 into the capacitor 68. At this juncture, the converter 50 is said to be at the forward rectification mode.

During the blanking time tB within the time period t1, both the FETs 56 and 58 are turned off. No voltage is induced in the secondary winding 66 of the transformer 62. At the same time in the output circuit 24, since the secondary voltage $v_S$ at the secondary winding 30 sits at zero potential and there is stored energy in the circuit portion at the cathode side of the diode 66, the diode 66 is reversely biased. Magnetic energy stored in the inductor 67 discharges into the capacitor 68. The converter 50 is said to be at the freewheeling mode. It also should be noted that during this time interval in the vicinity of the high-to-low transition, the stored energy in the transformers 26 and 62 sends out resetting current in an attempt to maintain their original current flows. The resetting currents manifest themselves as few damping oscillating cycles superimposed on the high-to-low transitions on some waveforms, such as $v'_S$. However, for practical purposes, the mild waveform distortion caused by the small amount of resetting currents during transitions can be ignored.

During the time period t2, when the FET 58 is turned on, the FET 56 is turned off. The primary current $i_P$ flows from the positive terminal of the input 31 through the primary winding 28 and the FET 58. Then, the current $i_P$ passes through the toroidal core 64 of the sensing transformer 62. This time, a negative pulse is induced in the secondary winding 66 of the transformer 62, as shown in the waveform $v'_S$ at the node 78 during the period t2 in FIG. 6. Again, during the blanking time tB within the time period t1, both the FETs 56 and 58 are turned off. No voltage is induced in the secondary winding 66.

Voltage $v_S$ at the secondary winding 30 of the transformer 26 basically assumes the same wave shape as the primary winding voltage $v_P$ at the primary winding 28 but is stepped down in amplitude by the ratio N1/N2. In this case, the coupling ratio N1/N2 is 10. The secondary winding voltage $v_S$ waveform is as shown in FIG. 6. The relationship between the secondary current $i_S$ and the primary current $i_P$ of the transformer 26 can be expressed as follows, in accordance with equation (2):

$$\frac{i_S}{i_P} = \frac{N1}{N2} \quad (6)$$

It also should be noted that the primary current $i_P$ flowing through the primary winding 28 is composed of two components, namely, the magnetizing current, and the load current. The magnetizing current is needed to sustain change of magnetic flux in the transformer core 32 of the transformer 26, even without any load on the secondary winding 30. However, in practice, the magnetizing current is small in comparison to the load current and thus can be neglected. That is, for practical purposes, in equation (6), the primary current $i_P$ can be assumed to contain only the load current.

Reference is now directed to the current sensing circuit 34. In the sensing transformer 62, since there are two primary windings 60A and 60B, the current path 33 leading from the first circuit 22 to the sensing circuit 34 includes path branches 33A and 33B, respectively. The current transformer 62 is coupled to the current paths 33A and 33B. The primary current $i_P$ passing through the primary winding 28 of the transformer 26 also passes through the primary winding 66A or 66B of the sensing transformer 62, via the current branches 33A and 33B, respectively. When the primary current $i_P$ goes through the sensing circuit 34 via the input circuit 22, from equation (2) above, a secondary current $i'_S$ is also induced into the secondary winding 66 of the transformer 62 as expressed by the following algebraic equation:

$$\frac{i'_S}{i_P} = \frac{N3}{N4} \quad (7)$$

Combining equations (6) and (7), it can be shown that the secondary current $i_S$ of the transformer 26 and the secondary current $i'_S$ s of the transformer 62 bear a definite relationship to each other and is expressed by the following expression:

$$i_S = \left(\frac{N1}{N2}\right)\left(\frac{N4}{N3}\right)i'_S \quad (8)$$

Thus, if the secondary current $i'_S$ of the sensing transformer 62 is known, the secondary current $i_S$ of the transformer 26 can also be ascertained. The detecting circuit 36 is installed to perform this task.

First, the secondary current $i'_S$ of the sensing transformer 62 needs to be converted to a voltage value. To accomplish this end, the secondary current $i'_S$ sourcing out of the secondary winding 66 of the transformer 74 is rectified by the bridge rectifier 42. A rectified current $i_{80}$ results and is then fed to the resistor 44. In accordance with Ohm's law, the voltage at the node 80 can be expressed by the following algebraic relationship:

$$v_{80} = RS \, i'_S \quad (9)$$

where RS is the Ohmic value of the resistor 44 and the $v_{80}$ is the voltage value at the circuit node 80 of the detecting circuit 36. Hereinafter, any voltage or current symbol with an accompanying number as a subscript denotes the voltage or current value at the node identified by the subscript. Thus, for example, $v_{80}$ denotes the voltage value at the node 80.

Combining equations (8) and (9), the secondary current $i_S$ of the transformer 26 can be mathematically expressed as a function of the secondary voltage $v_{80}$ of the sensing transformer 62 as follows:

$$i_S = \left(\frac{N1}{N2}\right)\left(\frac{N4}{N3}\right)\frac{v_{80}}{RS} \quad (10)$$

The waveform of the resultant voltage $v_{80}$ is shown in FIG. 6. The wave shape of the secondary voltage $v_{80}$ substantially assumes the same shape as that of the primary voltage $v_P$ of the transformer 26 but is rectified and further with a different amplitude. There is also a slight rising slope on the waveform $v_{80}$ within the forward rectification time tf. The slight slope is caused by the ramping of the magnetizing current of the transformer 26 along with the current of the charging inductor 67 in the output circuit 24 during the forward rectification mode. Again, for practical purpose, the slight slope is quite negligible and can be ignored. In this particular case, peak current and voltage values are of special interest. The secondary current $i_S$ has a peak current value IM. Likewise, the voltage $v_{80}$ has a peak value VM. In the special case where only peak values are involved, equation (10) can be rewritten as follows:

$$IM = \left(\frac{N1}{N2}\right)\left(\frac{N4}{N3}\right)\frac{VM}{RS} \quad (11)$$

Referring to the output circuit 24 in FIG. 3 and the waveform $I_{OUT}$ shown in FIG. 6, after rectification through the circuit 24, the output current $I_{OUT}$ basically maintains a DC level superimposed with ripples but with a peak current value IM of the secondary current $i_S$. The magnitude of the supposed ripples can be controlled and determined and will be discussed later. If the ripple content is negligible, equation (11) can be rewritten again as follows:

$$I_{OUT} = \left(\frac{N1}{N2}\right)\left(\frac{N4}{N3}\right)\frac{VM}{RS} \quad (12)$$

where the parameters are all defined as above. From equation (12), the output current $I_{OUT}$ passing through the load 72 has a linear relationship with the peak voltage VM. The peak voltage VM is the peak voltage value of the output voltage $v_{80}$ at the output of the bridge rectifier 42. Thus, if the peak voltage value VM of the voltage $v_{80}$ is known, the load current $I_{OUT}$ can be determined in accordance with equation (12).

The RC circuit 48 installed in the detecting circuit 36 performs the duty of extracting the peak voltage VM of the voltage $v_{80}$, and makes the peak voltage VM available for measurement at the output node 40 of the detecting circuit 36.

As mentioned above, when the rectified secondary current $i_{80}$ impinges upon the resistor 44, the current $i_{80}$ is translated into a corresponding secondary voltage $v_{80}$ at the node 80 of the detecting circuit 36. As is well known, the input impedance of the input 47 of the operational amplifier 49 is high and can be assumed to be infinite. The gain of the amplifier 49 is also assumed to be infinitely high. As such, theoretically, no current can pass into the inputs of the operational amplifier 49. Consequently, the voltage difference between the assertive and complementary inputs of the operational amplifier 49 can be assumed to be zero. Phrased differently, the complementary and assertive inputs are virtually shorted together. As a result, the voltage at the output of the operational amplifier 49 is equal to the voltage $v_{80}$ at the assertive input of the amplifier 49. That is, the voltage at the output of the operational amplifier 49 follows the voltage $v_{80}$ at the node 80. After passing through the diode 42, the output voltage of the amplifier 49 is rectified.

At the onset of the time interval t1 when the voltage $v_{80}$ is at its positive polarity, the diode 42 is forward biased. The rectified current $i_{S1}$ charges into the capacitor 74 via the forward biased diode 42. The charging process continues throughout the time duration tf within the time period t1. The rate of charging is characterized by the RC time constant of the circuit 36. It should be noted that in this instance, the C (Capacitance) part of the RC time constant is mostly the capacitance value of the capacitor 74. However, the R (Resistance) part of the RC time constant is mostly contributed by the resultant resistance of the resistors 44 and 76 connected in parallel. The reason is the rectified voltage follower 46, as mentioned above, acts like a short circuit during the time duration tf, thereby shorting the node 80 and the input 51 together. The resultant wave shape is the charging slope labeled 82 shown in FIG. 6 as part of the waveform $V_{40}$.

During the time period t1 and entering into the blanking period tB, both FETs 56 and 58 are turned off. There is no primary current $i_P$ flowing through the primary winding in the transformers 26 and 62, respectively. Consequently, voltage $v_{80}$ returns to zero. With charges stored in the capacitor 74 and the node 80 at zero potential, the diode 42 is reversely biased. This time, the charged capacitor 74 discharges into the resistor 76. The rate of discharge is again characterized by the RC time constant of the circuit 48. This time, the C part of the RC time constant is still the same capacitance value of the capacitor 74. However, the R part of the RC time constant is contributed only by the resistance of the resistors 76. The reason is the rectified voltage follower 46, with the diode 42 reversely biased, acts like an open circuit during the time duration tB. The resultant wave shape is the discharging slope labeled 84 shown in FIG. 6 as part of the waveform $v_{40}$ during the time duration tB within the time period t1. As can be seen, the discharging slope 84 is more sluggish in comparison to the charging slope 82 because of different RC time constants as explained above.

Entering into the time period t2, the process repeats itself substantially in the same manner as in the time period t1, except that the FET 58 in the input circuit 22 conducts this time. For reason of brevity, the operational details during the time period t2 is not repeated.

The output voltage $v_{40}$ available at the node 40 of the detecting circuit 36 assumes an approximate sawtooth wave shape, as exaggeratedly shown in FIG. 6 for purpose of illustration. The sawtooth portion of the voltage $v_{40}$ constitute ripples and is labeled VR in FIG. 6. The amplitude of the output ripple VR on the waveform $v_{80}$ can be adjusted according to applications. In usages where accurate readings are required, the amplitude of the ripple VR can be set as a very small fraction of the overall amplitude of the detector output voltage $v_{40}$. The charging slope denoted by the reference numeral 82 in fact behaves in accordance with Equation (4) with the RC time constant as described above. Likewise, the discharging slope signified by the reference numeral 84 is governed by Equation (5) with another RC time constant again as discussed above.

The ripples VR superimposed on the voltage $v_{40}$ available at the output node 40 can be adjusted to suit particular applications. The amplitude of the ripples VR basically depends on the RC time constant. That is, the RC time constant can be determined in advance to accommodate the tolerable ripple noise VR. The following description describes a way of confining the ripple noise VR by adjusting the RC time constant.

It begins with Equations (4) and (5) which set forth the charge q as a function of time t in a RC circuit. Equation (4)

and (5) can also be expressed in terms of the voltage v as a function of time t.

Referring back to FIG. 3, in the RC circuit 48 of the first embodiment 50, where the RC time constants for charging and discharging are different as explained above, any one of the time constants can be chosen for analysis. In this case, the charging time constant $R_1C$ is selected. Attention is first directed to the capacitor 74 in FIG. 3. As is well known, the voltage $v_{40}$ across the capacitor 74 is expressed in accordance with the following equation:

$$v_{40} = \frac{q}{C} \tag{14}$$

where q is the charge stored in the capacitor 74 in Coulombs; and C is the capacitance value in Farads.

Substituting Equation (14) into Equation (4), Equation (4) can be rewritten again as follows:

$$v = \Delta V_1 \left(1 - e^{-\frac{t-T1}{R_1C}}\right) \tag{15}$$

where v is the instantaneous voltage across the capacitor 74 in Volts; $\Delta V_1$ is the difference in voltage levels also in Volts before and after the charging process; and $R_1C$ is the charging time constant in which the R part constitutes resistors 44 and 76 connected in parallel, as explained above.

Figure 7:
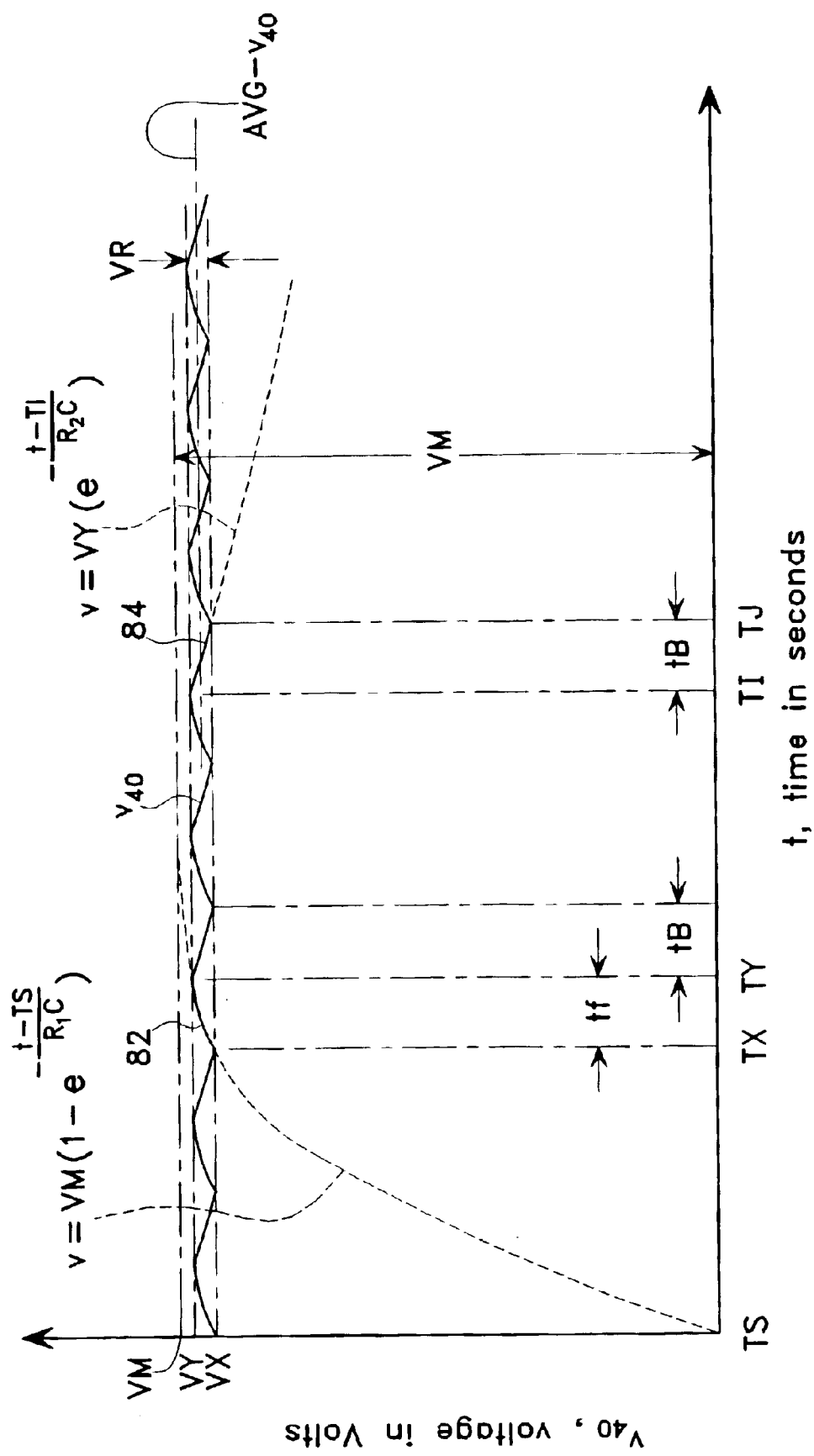
FIG. 7 is a timing diagram showing the output waveform of the detecting circuit of the first embodiment in an enlarged scale.

Reference is also directed to FIG. 7, which shows the waveform $v_{40}$ of FIG. 6 on a larger scale and with the ripple voltage VR again exaggeratedly illustrated for purpose of explanation. Referring to a particular charging slope labeled 82 of FIG. 7, and assume the charging slope 82, if extended, starts from the time at t=TS when the voltage level is zero to the time at t=∞ when the voltage level is at $v_{40}$=VM. However, under the control of the control circuit 136, the charging and discharging processes starts and terminates at the time t=TX and t=TY, respectively. The time duration from TX to TY in fact is the forward rectification time tf, during which time the voltage $v_{40}$ is charged up by an incremental value from VX to VY as shown in FIG. 7. The voltage difference between the voltage values VY and VX is in fact the ripple voltage VR. Substituting the these values into Equation (15), the following two equations result:

$$VY = VM\left(1 - e^{-\frac{TY-TS}{R_1C}}\right) \tag{16}$$

$$VX = VM\left(1 - e^{-\frac{TX-TS}{R_1C}}\right) \tag{17}$$

Take the difference of Equations (16) and (17) and rearranging terms, the following equation ensues:

$$\frac{VR}{VM} = \left(e^{-\frac{TY-TS}{R_1C}} - e^{-\frac{TX-TS}{R_1C}}\right) \tag{18}$$

In Equation (18), the first term on the right side of the equation can be expressed into an exponential series. Likewise, the second term on the right side of the equation can also be expressed into another exponential series. Expressing the terms into exponential series, Equation (18) can be rewritten as follows:

$$\frac{VR}{VM} = 1 + \left(-\frac{TY-TS}{R_1C}\right) + \frac{\left(-\frac{TY-TS}{R_1C}\right)^2}{2!} + \tag{19}$$

$$\ldots - 1 - \left(-\frac{TX-TS}{R_1C}\right) - \frac{\left(-\frac{TX-TS}{R_1C}\right)^2}{2!} - \ldots$$

In Equation (19), if value of the time constant $R_1C$ is much larger than the corresponding value of (TY–TX), any terms with the power of 2 or higher can be ignored. Simplifying Equation (19), the following equation is obtained:

$$\frac{VR}{VM} \cong \frac{TY-TX}{RC} \cong \frac{tf}{R_1C} \tag{20}$$

From Equation (20), the term VR/VM in fact is the tolerable ripple ratio which is directly proportional to the ratio of the forward rectification time tf and the charging time constant $R_1C$. Differently put, from Equation (20), the $R_1C$ time constant can be determined depending on the tolerable noise ratio VR/VM, and vice versa. The measured output voltage $v_{80}$ at the output node 40 of the detecting circuit 36 is the average of the ripple voltage VR below the maximum voltage VM. The higher the RC time constant, the closer the voltage value provided at the output 40 is to the average of the ripple voltage VR below the maximum voltage VM, as shown by the average line labeled AVG–$v_{40}$, shown in FIGS. 4 and 7.

The same holds true for the output circuit 24. As with the RC circuit 48, the output current $I_{OUT}$ sourcing out of the output circuit 24 is also affixed with ripples labeled as IRR shown in FIG. 6. The amplitude of the output ripples IRR depends on the inductive value of the inductor 67, the capacitive value of the capacitor 68, and the load 72. Thus, an average output current AVG–$I_{OUT}$ can also be deduced as shown in FIG. 6. However, the closer the average voltage AVG–$v_{40}$ at the output 40 is detected and substituted into Equation (12), the closer is the average output current AVG–$I_{OUT}$ reported as a consequence.

It should be mentioned that the discharging time constant $R_2C$ in the RC circuit 48 of FIG. 3 can also be used to substitute into Equation (5) to arrive at the same result similar to Equation (20) as described above. Thus, the current monitoring scheme in accordance with the invention allows detection and monitoring of the output current $I_{OUT}$ via measuring the signal generated from the RC circuit 48, which is coupled to the input circuit 22 (FIG. 3). In contrast, detecting current directly from the output 35 of the output circuit 24 without the invention involves implementing detecting circuitry that deals with currents of high magnitudes. As mentioned before, such implementation entails more complexity, higher power loss, and associated disadvantages as mentioned above.

There are applications in which the occurrences of noticeable ripples, even though tolerable, are unavoidable. For example, in miniaturized circuits where the use of large capacitors are impractical, output ripples can be quite eminent. As another example, in usages where accurate and instantaneous output values need to be reported, ripple noise, no matter how controllably attenuated, still occupies a portion of the measured output voltage $v_{40}$. The following paragraphs describe a method of detecting the instantaneous values of the output voltage $v_{40}$, which includes its ripple content. The ripple voltage VR measured on the detecting circuit 36 directly correlates with the corresponding output current ripple IRR of the output circuit 24. More in particular, by appropriately selecting the components in the detecting circuit 36, the instantaneous current corresponding to the current ripple IRR at the output 35 of the output circuit 24 can be ascertained by directly measuring the instantaneous output $v_{40}$.

To begin with, as described before, under normal operating conditions, the converter circuit 50 is characterized by two modes of operation, namely, the forward rectification mode and the freewheeling mode. In addition, the RC circuit 48 operates under the charging and discharging modes. In accordance with the invention, during normal operation, the forward rectification and the freewheeling modes are respectively in synchronization with the charging and discharging modes. Specifically, during the time duration tf, the output circuit 24 enters into the forward rectification mode and at the same time the RC circuit 48 is charging. Likewise, during the blanking period tB, the output circuit 24 reverts to the freewheeling mode and simultaneously the RC circuit 48 is discharging.

Again, referring back to FIG. 3, in the RC circuit 48 of the first embodiment 50, where the RC time constants for charging and discharging are different, any one of the time constants can be chosen for analysis. In this case, the discharging time constant $R_2C$ is selected. In a manner similar to that as previously explained, the voltage $v_{40}$ across the capacitor 74 during discharging can be expressed by the following equation:

$$v = \Delta V2 \left( e^{-\frac{t-T2}{R_2 C}} \right) \quad (21)$$

where $\Delta V2$ is the difference in voltage levels in Volts before and after the discharging process; T2 is the starting time of the discharging process in seconds; $R_2C$ is the discharging time constant in which the R part constitutes only the resistor 76; and the other parameters are as defined above.

Reference is now directed again to FIG. 7. This time, attention is focused on the discharging slope 84. Assume the discharging process starts at t=TI when the voltage $v_{40}$ is at VY and terminates at t=TJ when the voltage $V_{40}$ is at VX, as shown in FIG. 7. The time duration from TI to TJ in fact is the blanking time tB which has the same duration as the freewheeling time. The voltage difference between the voltage values VY and VX in fact is the ripple voltage VR. Substituting these values into Equation (21) and take the difference in a manner similar to that as previously described, the following equation results:

$$VR = VY \left( 1 - e^{-\frac{TJ-TI}{R_2 C}} \right) \quad (22)$$

where all the parameters are above defined.

In Equation (22), within the parenthesis on the right side of the equation, the exponential term can be expressed into an exponential series, and thereafter rearranging the terms, Equation (22) can be rewritten as follows:

$$VR = VY \left[ 1 - \left[ 1 + \left( -\frac{TJ-TI}{R_2 C} \right) + \frac{\left( -\frac{TJ-TI}{R_2 C} \right)^2}{2!} + \ldots \right] \right] \quad (23)$$

In Equation (23), if value of the time constant $R_2C$ is much larger than the corresponding value of (TJ–TI), any term with the power of 2 or higher can be ignored. Simplifying Equation (23), the following equation is obtained:

$$VR = VY \left( \frac{TJ-TI}{R_2 C} \right) \quad (24)$$

The term (TJ–TI) is the blanking time tB, which is also the time the output circuit 24 enters into the freewheeling mode. Attention is now directed to the output circuit 24 of FIG. 3 in conjunction with the timing diagram of FIG. 7. As mentioned before, within the time duration tB, the output circuit 24 is also freewheeling. That is, to maintain the original secondary current $i_S$ flow, the inductor 67, with energy stored in the previous cycle, discharges current into the capacitor 68. As a consequence, the output voltage $V_{OUT}$ is an exponential decay as shown by the wave form 97 in FIG. 6. However, the inductor 67 and the capacitor 68 both assume very high values. Therefore, the exponential decay within the duration tB from the time at t=TI to the time t=tJ is very sluggish and can be approximated to be linear by the following equation:

$$i_S = IM - \frac{[AVG - V_{OUT}](t - TI)}{L} \quad (25)$$

where $i_S$ is the instantaneous secondary current in Amperes; IM is the maximum output current at the output 35 of the circuit 24; AVG–$V_{OUT}$ is average output voltage in Volts, similar to the average output current, AVG–$I_{OUT}$, as shown in FIG. 6; and the other parameters are as previously defined.

In this particular example, the freewheeling mode starts at the time t=TI and ends at the time t=TJ. Within this time duration, the amplitude change of the output current $i_S$ in fact the ripple current IRR (FIG. 6). Substituting the parameters into equation (25), the following expression can be obtained:

$$IRR = IM - i_S(TJ) = \frac{[AVG - V_{OUT}](TJ - TI)}{L} \quad (26)$$

where the parameters are all defined previously.

The voltage $v_{80}$ in the detecting circuit 36 is at ground potential during the blanking period tB (FIG. 6). The reason is because the bridge rectifier 42 has diodes arrangement which blocks off voltage at the node 80 during this time. However, if the bridge rectifier 42 were arranged to have the diode combination to be forward biased within the time duration tB, Equation (10) would also applied. Substituting the values into Equation (10), a corresponding ripple voltage VR' during the blanking time tB may also be obtained:

$$VR' = \left[ \frac{(AVG - V_{OUT})(TJ - TI)}{L} \bigg/ \left( \frac{N1}{N2} \right) \left( \frac{N4}{N3} \right) \left( \frac{1}{RS} \right) \right] \quad (27)$$

where all the parameters are all defined above. It should be noted that the ripple voltage VR' is the result of extrapolation and is imaginary, as compared to the actual ripple voltage VR which is real and measurable.

Equating Equations (24) and (27) and rearranging the terms, the extrapolated ripple voltage VR' and the measured ripple voltage VR would be identical if the following condition is met:

$$R_2C = \left(\frac{VY}{AVG - V_{OUT}}\right)\left(\frac{L}{RS}\right)\left(\frac{N1}{N2}\right)\left(\frac{N4}{N3}\right) \quad (29)$$

Thus, by properly selecting the value of the discharging time constant $R_2C$, the instantaneous voltage $v_{40}$ measured at the output 40 of the detecting circuit 36 directly corresponds to the output current $I_{OUT}$, including the instantaneous ripple content IRR.

Again, in accordance with the invention, the conventional practice of directly measuring the output current for monitoring is dispensed with. Instead, the output current is monitored via detecting the input circuit's current which has a much lower power content.

Figure 8:
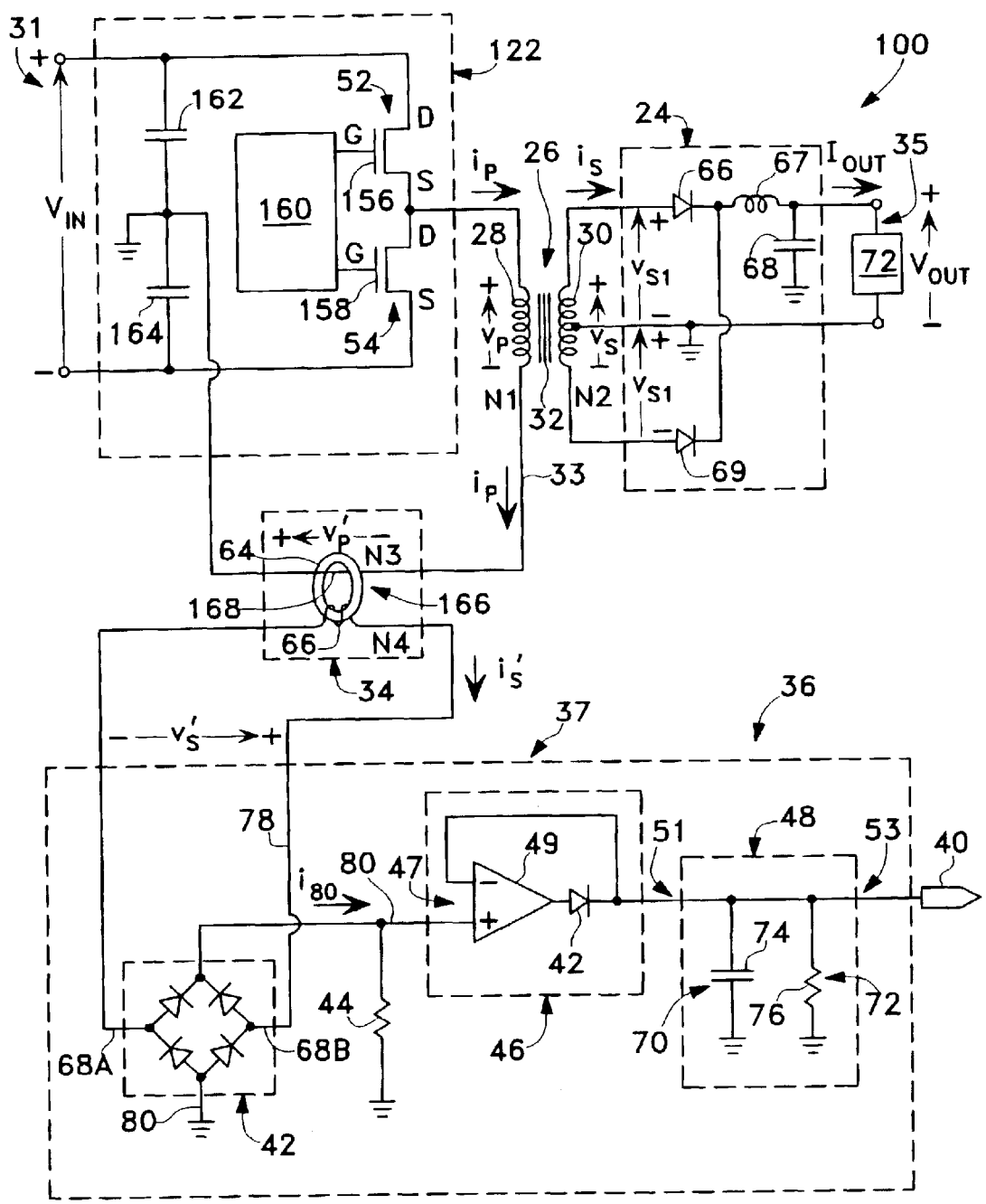
FIG. 8 is a schematic drawing showing the implementation of a second embodiment of the invention.

FIG. 8 shows the second embodiment of the invention signified by the reference numeral 100. This embodiment 100 is substantially similar to the previous embodiment 50. For the sake of conciseness, only the differences are herein highlighted.

The embodiment of this invention differs from the previous embodiment in the structural arrangement of the input circuit 122. Instead of a push-pull circuit, the input circuit 122 is a half-bridge switching circuit.

The input circuit 122 includes a pair of switches 52 and 54, implemented as FETs 156 and 158, respectively, in this case. Each of the FETs 156 and 158 has a drain D, a source S, and a gate G. The gates G of the two FETs 156 and 158 are tied to the two outputs of the control circuit 160. The drain D of the FET 156 is attached to the positive terminal of the input voltage $V_{IN}$. In a similar manner, the source S of the FET 158 is connected to the negative terminal of the input voltage $V_{IN}$. The source S of the FET 156 and the drain D of the FET 158 are linked together and connected to one end of the primary winding 28. In this embodiment, the primary winding 28 of the transformer 26 is not center-tapped. The other end of the primary winding 28 is routed to the ground terminal which is separated by two buffering capacitors 162 and 164 that are installed to provide the transformer 26 with a mid reference voltage point for the input voltage $V_{IN}$. The transformer 26 is also a step-down transformer having N1 and N2 winding turns for the primary and secondary windings 28 and 30, respectively.

Similar to the previous embodiment, the current sensing circuit 34 is a current transformer 166 with a toroidal core 64. Wound around the toroidal core 64 is a secondary winding 66 which are connected across the AC terminals 68A and 68B of a bridge amplifier 42. In this embodiment, there is only one primary winding 168 wound around the toroidal core 64.

The operation of the second embodiment 100 is also substantially similar to the first embodiment 50. In fact, the same timing diagram as shown in FIG. 6 can also be used. Again, for conciseness and ease of explanation, numerals values are used. These numerical values are intended to be exemplary and by no means construed as limiting.

Reference is now directed to FIG. 8 in conjunction with FIG. 6. Suppose an input DC voltage $V_{IN}$ of 100 V peak-to-peak is intended to be converted to an output voltage $V_{OUT}$ of 5 V. First, the DC input voltage $V_{IN}$ is applied to the input 31 of the input circuit 122. In this instance, the input ranges from the negative polarity of −50 V to the positive polarity of +50 V. The input voltage $V_{IN}$ basically is applied across the two FETs 156 and 158, which are turned on and off alternatively as controlled by the control circuit 160. Specifically, during the time period ti (FIG. 6), when the FET 156 is turned on, the FET 158 is turned off. The primary current $i_P$ flows from the positive terminal of the input 31 through the FET 156 and then the primary winding 28. Thereafter, the current $i_P$ returns to the ground terminal. In the next cycle during the time period t2, the FET 156 is turned off but FET 158 is turned on. This time, the current $i_P$ flows from the ground terminal, through the primary winding 28 and then the FET 158, and thereafter returns to the negative terminal of the input 31.

The alternating turning on and off of the FETs 56 and 58 in essence chops the DC input voltage $V_{IN}$ into a time-varying signal as waveform $v_S$ across the primary winding 28. The wave shape of the time-varying signal $v_P$ is as shown in FIG. 6. It should be noted that for each cycle period t1 or t2, there is a blanking time tB superimposed within. During the time period tB, both the FETs 156 and 158 are shut off.

Voltage at the secondary winding $v_S$ basically assumes the same wave shape as the primary winding voltage $v_P$ but is stepped down in amplitude by the ratio N1/N2. The secondary winding voltage $v_S$ waveform is as shown in FIG. 6. In a similar manner as in the previous embodiment, the primary current $i_P$ passing through the primary winding 28 of the transformer 26 also passes the primary winding 168 of the sensing transformer 166. As a consequence, a secondary current $i'_S$ is also induced. With the secondary voltage $v'_S$ available at the input 38 of the detecting circuit 36, the detecting process is substantially similar to that of the previous embodiment and is thus not further repeated.

Figure 9:
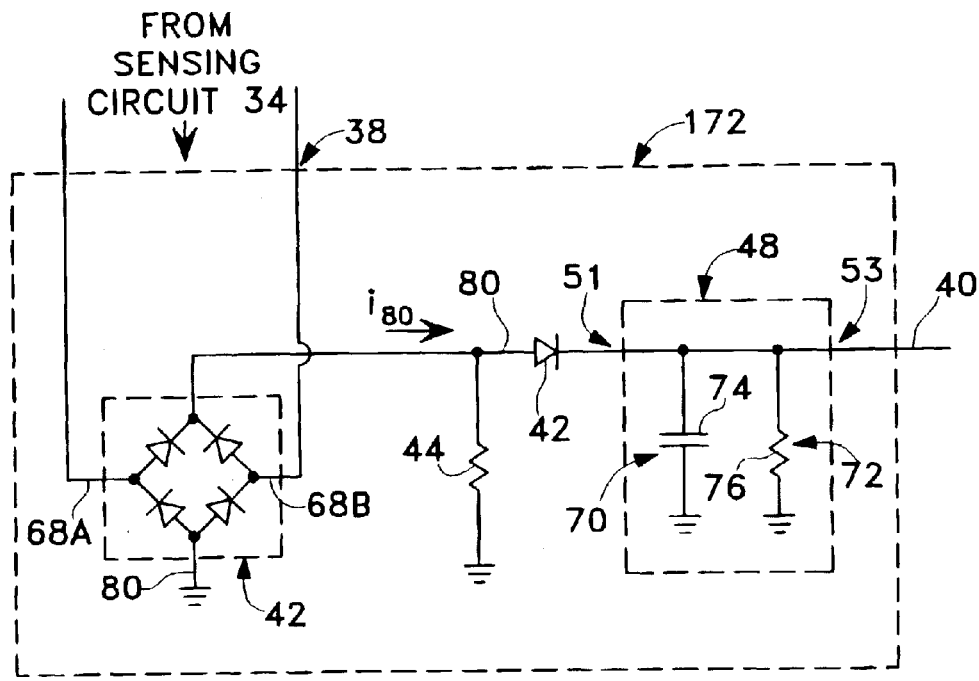
FIG. 9 is a schematic drawing showing a variation of the implementation of the sensing circuits of the embodiments.

Finally, other changes are possible within the scope of the invention. Described in all the embodiments, there is a rectified voltage follower 46 disposed in the detecting circuit 36. If the output voltage $v_{40}$ is comparatively large, the voltage follower 46 can be dispensed with as shown in the detecting circuit 172 of FIG. 9. In the detecting circuit 172, the resistor 44 directly ties to anode of the diode 42 without passing through any operational amplifier. The cathode of the diode 42 then drives the RC circuit 48. In this case, the voltage $v_{40}$ does not follow the voltage $v_{80}$. Instead, during the charging process within the time duration tf (FIG. 6), the voltage $v_{40}$ differs from the voltage $v_{80}$ by a diode drop $\phi$ caused by the forward biased diode 46. The value of the diode drop $\phi$ is approximately 0.7 V. If the voltage value $v_{40}$ is relatively large, the value of the diode drop $\phi$ can be ignored in Equation (12). Thus, the detecting circuit 172 can replace the detecting circuit 36 in both embodiments for designs when the voltage $v_{40}$ is comparatively high in value. On the other hand, if the voltage value $v_{40}$ is comparatively small and the detecting circuit 172 is used, the diode drop $\phi$ needs to be subtracted from the maximum voltage VM in Equation (12).

Figure 10:
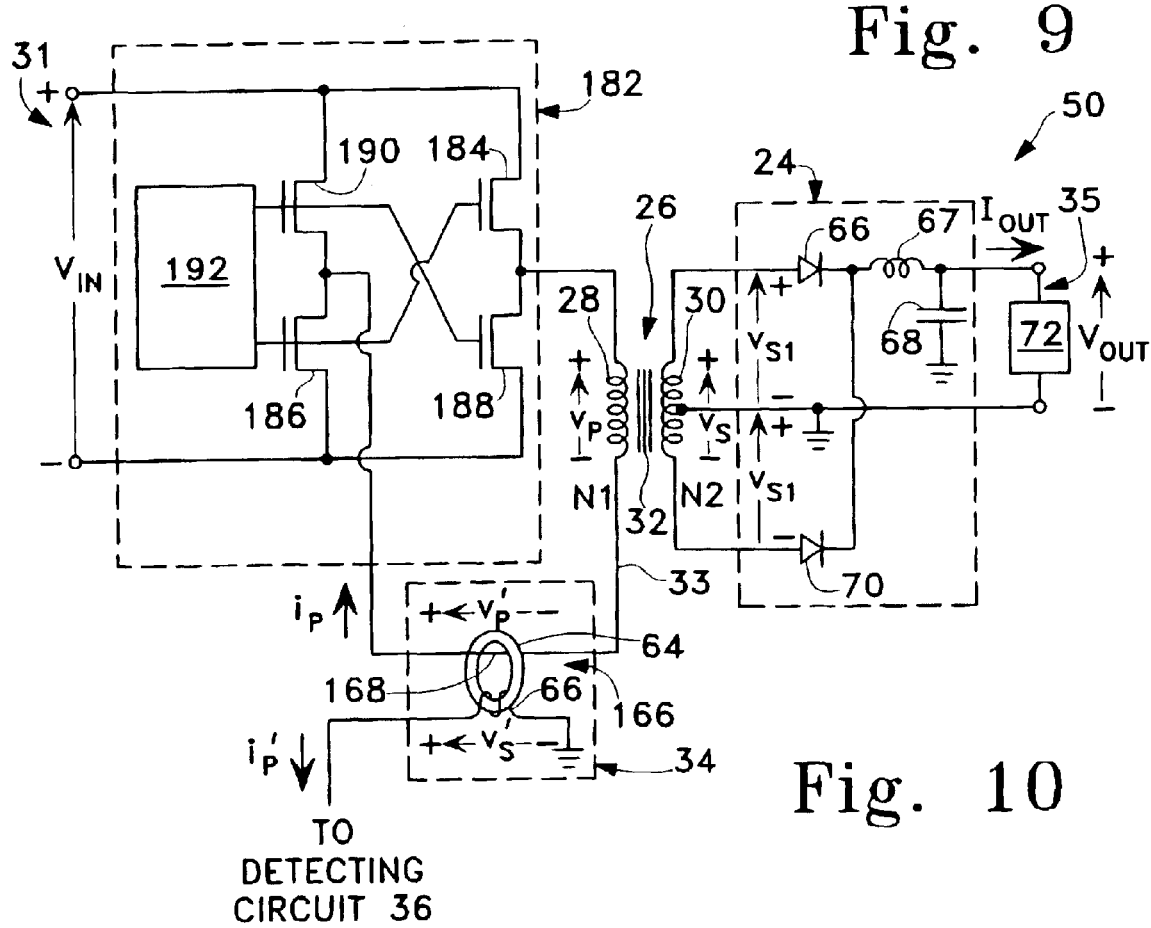
FIG. 10 is a schematic drawing showing a variation of the implementation of the second embodiment.

Described in the second embodiment 100, the input circuit 122 is depicted as a half-bridge switching circuit. It is possible that the input circuit 182 can be slightly modified as input circuit 142 which is a full-bridge switching circuit as shown in FIG. 10. In input circuit 182, it includes four FET switches 184, 186, 188 and 190 controlled by the control circuit 192. During the time period t2 (FIG. 6), FETs 184 and 186 are turned on while FETs 188 and 190 are turned off. Conversely, during the time period t1 (FIG. 6), FETs 188 and 190 are turned on while FETs 184 and 186 are turned off. The resultant secondary voltage $v_{80}$ across the secondary winding 66 of the transformer 166 is the same as that of the second embodiment 100 and as shown in FIGS. 6 and 8.

Figure 11:
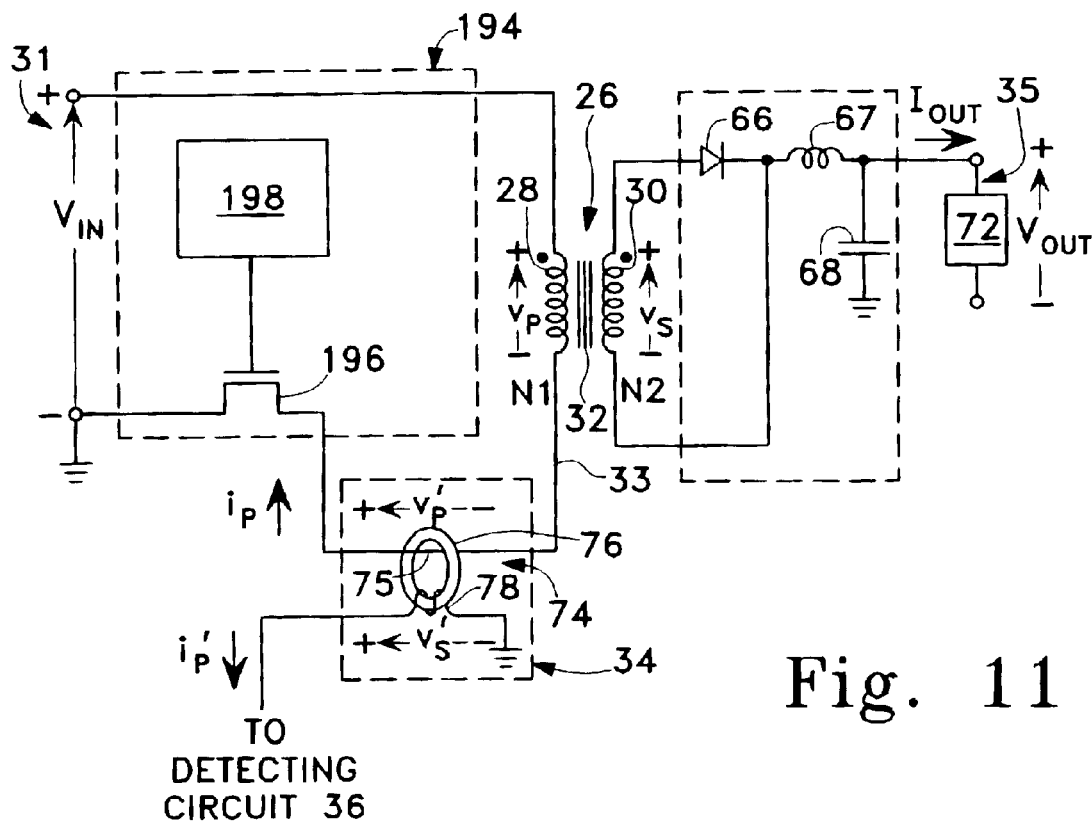
FIG. 11 is a schematic drawing showing another variation of the implementation of the invention.

It is also conceivable that the input circuit can be implemented with a single switch as shown in FIG. 11, which input circuit is denoted by the reference numeral 194. Disposed inside the input circuit 194 is a FET 196 controlled by a control circuit 198. The FET 196 is tied to the primary winding 28. During operation, the FET 196 switches on and off and thereby chopping the input voltage $V_{IN}$ into a time-varying signal $v_{IN}$ in a similar manner as the previous embodiments. One major difference between this embodiment and the previous embodiments is that there is a DC bias in the core 76. The DC magnetization must be reset at each switching cycle to prevent accumulation of magnetic saturation. Further, the bridge rectifier 42 in the detecting circuit 36 (FIGS. 3 and 8) needs to be replaced with a single diode, which is used to isolate any resetting voltage glitches from appearing at the output 40 of the detecting circuit 36.

Figure 12:
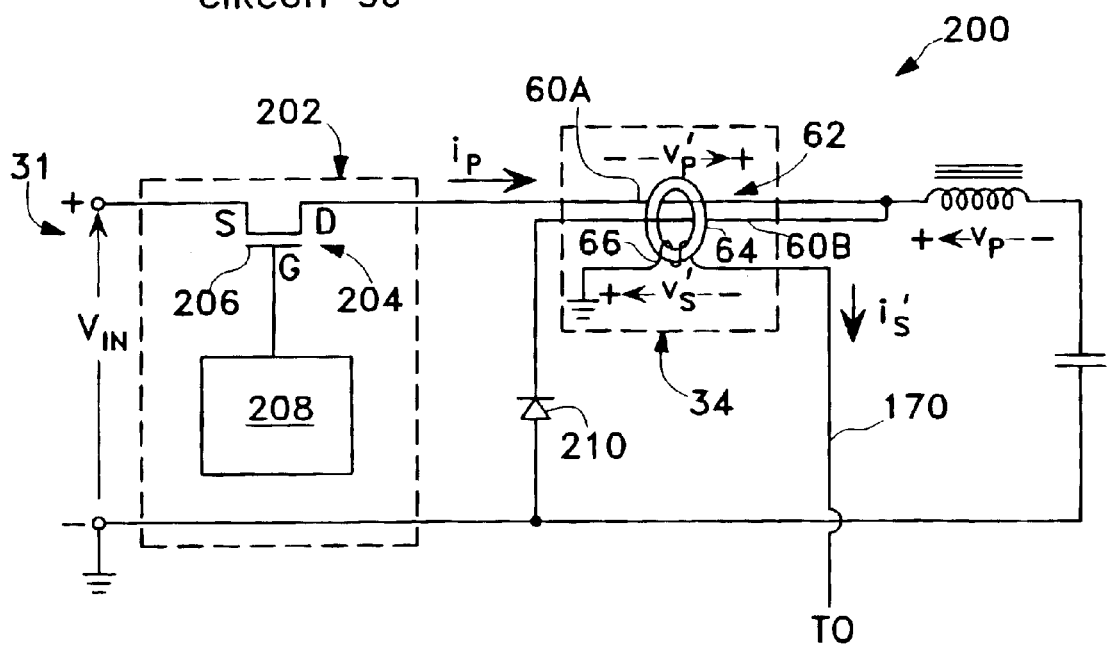
FIG. 12 is a schematic drawing showing yet another variation of the implementation of the invention.

In addition, the input circuit can be implemented in the form of a buck switching circuit signified by the reference numeral 200 as shown in FIG. 12. In this implementation, the input circuit 202 includes a switch 204 which is a FET 206 driven by a control circuit 208. The FET 206 has a drain D, a source S, and a gate G. The drain D of the FET 206 is tied to a first primary winding 60A of the transformer 62. A second primary winding 60B wound in the opposite direction of the first primary winding 60A around the toroidal core 64 of the transformer 62 is then connected to the ground terminal through a freewheel diode 210. The primary winding configuration of this converter 200 is substantially similar to the first embodiment 50 shown in FIG. 3. Thus, as in the first embodiment 50, the currents flowing through the two primary windings 60A and 60B generate opposite flux in the core 64. However, the winding ratio N1/N2 for the transformer 26 must be fixed to unity in this case because current flows directly through the primary winding 60A and 60B.

Moreover, the RC circuit 48 described in all the embodiments is made of discrete components. It is possible to rely on distributed components, such as the parasitic resistance and capacitance of any circuit layout, to provide for in whole or in part the respective R part or C part of the RC time constant.

Furthermore, all the switches described in the embodiments involve the use of FETs. It certainly is feasible that other kinds of switches can be used, such as bipolar transistors, or IGBTs (Insulated Gate Bipolar Transistors). The current sensing circuit need not involve a current transformer as depicted. Other types of current sensing schemes are also possible, such as a sense circuit with a sense resistor or a Hall effect device. It will be understood by those skilled in the art that these and other changes in form and detailed may be made therein without departing from the scope and spirit of the invention.

What is claimed is:

1. A power converter comprising:
   first and second circuits;
   a transformer having primary and secondary windings respectively coupled to said first and second circuits; and
   a detecting circuit coupled to said first circuit, said detecting circuit includes a RC circuit for operatively detecting a first current passing through said first circuit via said primary winding and generates via said RC circuit an output signal which is proportional in magnitude to a second current passing through said second circuit via said secondary winding when said power converter is energized.

2. The power converter as in claim 1 further including a sensing circuit disposed between said first winding and said detecting circuit.

3. The power converter as in claim 2 wherein said transformer being a first transformer, said sensing circuit includes a second transformer having third and fourth windings, said third winding being coupled to said first winding of said first transformer, and said fourth winding being coupled to said detecting circuit.

4. The power converter as in claim 2 wherein said detecting circuit further including a voltage follower circuit disposed between said RC circuit and said sensing circuit.

5. The power converter as in claim 2 wherein said detecting circuit further including a diode disposed between said RC circuit and said sensing circuit.

6. The power converter as in claim 1 wherein said output signal bears a linear relationship with said second current.

7. The power converter as in claim 1 wherein said converter being configured to operate at a predetermined switching frequency, said RC circuit includes a time constant, wherein the mathematical inverse of said time constant is substantially smaller than said switching frequency.

8. The power converter as in claim 1 being characterized by a forward rectification mode and a freewheeling mode, said RC circuit further being characterized by a charging mode and a discharging mode, wherein when said power converter is energized, said forward rectification and freewheeling modes being respectively in synchronization with said charging and discharging modes.

9. The switching-mode power converter as in claim 1 wherein said first circuit includes a single switch.

10. The switching-mode power converter as in claim 1 wherein said first circuit includes a half-bridge switching circuit.

11. The switching-mode power converter as in claim 1 wherein said first circuit includes a full-bridge switching circuit.

12. The switching-mode power converter as in claim 1 wherein said first circuit includes a buck switching circuit.

13. A power converter comprising:
    first and second circuits;
    a transformer having first and second windings respectively coupled to said first and second circuits; and
    a RC circuit having an input and an output, said RC circuit being electrically coupled to said first winding, such that when a first current passes through said first winding, said transformer inductively induces a second current passing through said second circuit via said second winding, said RC circuit detects said first current via said input and generates at said output an output signal which is proportional in magnitude to said second current passing through said second circuit.

14. The power converter as in claim 13 wherein said converter further including a sensing circuit disposed between said first winding and said input of said RC circuit.

15. The power converter as in claim 14 wherein said transformer being a first transformer, said sensing circuit includes a second transformer having third and fourth windings, said third winding being coupled to said first winding of said first transformer, and said fourth winding being coupled to said input of said RC circuit.

16. The power converter as in claim 15 wherein said converter further including a bridge rectifier disposed between said fourth winding of said sensing circuit and said RC circuit.

17. The power converter as in claim 16 wherein said converter further including a rectified voltage follower circuit disposed between said input of said RC circuit and said bridge amplifier.

18. The power converter as in claim 16 wherein said converter further including a diode disposed between said input of said RC circuit and said bridge amplifier.

19. The power converter as in claim 16 wherein said converter being a switching-mode power converter configured to operate at a predetermined switching frequency, said RC circuit further including a time constant, wherein the mathematical inverse of said time constant is substantially smaller than said switching frequency.

20. The power converter as in claim 16 being characterized by a forward rectification mode and a freewheeling mode, said RC circuit further being characterized by a charging mode and a discharging mode, wherein when said power converter is energized, said forward rectification and freewheeling modes being respectively in synchronization with said charging and discharging modes.

21. A power converter comprising:
   first and second circuits;
   a first transformer having N1 winding turns inductively coupled to N2 winding turns, the ratio of said N1 winding turns to said N2 winding turns being a first coupling ratio of said first transformer;
   a second transformer having N3 winding turns inductively coupled to N3 winding turns, the ratio of said N3 winding turns to said N4 winding turns being a second coupling ratio of said second transformer, said N1 winding turns of said first transformer being coupled to said N3 winding turns of said second transformer; and
   a detecting circuit having an input and an output, a RC circuit disposed between said input and said output, said N4 winding turns being connected to said input of said detecting circuit;
   wherein during operation, when a first current passes through said N1 winding turns, said first transformer induces a second current passing through said second circuit via said N2 winding turns, said N1 winding turns of said first transformer being connected to said N3 winding turns of said second transformer, thereby allowing said first current passing through said N1 and N3 winding turns to induce a third current passing through said N4 winding turns, said detecting circuit detects said third current via said input and passes said third current to said RC circuit which responds with an output signal at said output, said output signal being proportionally corresponds to the magnitude of said second current in accordance with the ratio: $(N1/N2) \times (N4/N3)$.

22. The power converter as in claim 21 wherein said converter being a switching-mode power converter configured to operate at a predetermined switching frequency, said RC circuit includes a time constant, wherein the mathematical inverse of said time constant is substantially smaller than said switching frequency.

23. The power converter as in claim 21 wherein said RC circuit includes a time constant which is proportional to the ratio: $(N1/N2) \times (N4/N3)$.

24. The power converter as in claim 21 wherein said detecting circuit further including a bridge rectifying circuit disposed between said input and said RC circuit.

25. The power converter as in claim 24 further including a rectified voltage follower disposed between said bridge rectifying circuit and said RC circuit.

26. The power converter as in claim 24 further including a diode disposed between said bridge rectifying circuit and said RC circuit.

* * * * *